(12) United States Patent
Young et al.

(10) Patent No.: US 6,957,047 B1
(45) Date of Patent: Oct. 18, 2005

(54) BI-DIRECTIONAL SWITCHED RF AMPLIFIER, WATERPROOF HOUSING, ELECTROSTATIC OVERVOLTAGE PROTECTION DEVICE, AND MOUNTING BRACKET THEREFOR

(75) Inventors: Michael F. Young, McLean, VA (US); Hunter Jones, Silver Spring, MD (US); John Casaer, McLean, VA (US); Paul Akimov, Springfield, VA (US)

(73) Assignee: YDI Wireless, Inc., Falls Church, VA (US)

( * ) Notice: Subject to any disclaimer, the term of this patent is extended or adjusted under 35 U.S.C. 154(b) by 0 days.

(21) Appl. No.: 09/505,201

(22) Filed: Feb. 16, 2000

Related U.S. Application Data

(60) Provisional application No. 60/120,639, filed on Feb. 18, 1999.

(51) Int. Cl.[7] .......................... H04B 1/44; H04B 1/40; H04B 17/00; H04B 1/00
(52) U.S. Cl. ........................ 455/83; 455/78; 455/79; 455/82; 455/84; 455/115; 455/226.1; 455/90.3; 455/560; 455/561
(58) Field of Search ............................. 455/78, 79, 83, 455/82, 84, 115, 226.1, 90.3, 560, 561

(56) References Cited

U.S. PATENT DOCUMENTS

| | | | |
|---|---|---|---|
| 3,955,250 A | 5/1976 | Heckethron | |
| 4,198,581 A | 4/1980 | Ahmed | |
| 4,335,415 A | 6/1982 | Hooberry | |
| 4,388,749 A | 6/1983 | Sassak | |
| 4,403,343 A * | 9/1983 | Hamada | ...................... 455/134 |
| D286,043 S | 10/1986 | Peterson | |
| 4,890,189 A | 12/1989 | Genevieve | |
| 4,972,346 A | 11/1990 | Kawano et al. | |
| 5,205,022 A | 4/1993 | Norton | |
| 5,267,297 A * | 11/1993 | Kawano et al. | ............. 455/561 |
| 5,274,888 A | 1/1994 | Payne | |
| 5,329,249 A * | 7/1994 | Cripps | ........................ 330/302 |
| 5,369,803 A | 11/1994 | Hirasawa et al. | |
| 5,502,715 A | 3/1996 | Penny | |
| 5,669,068 A * | 9/1997 | Kielmeyer et al. | ........... 455/83 |
| 5,687,938 A | 11/1997 | Bailey | |
| 5,701,595 A * | 12/1997 | Green, Jr. | ..................... 455/83 |
| 5,768,690 A * | 6/1998 | Yamada et al. | ................ 455/78 |
| 5,777,530 A * | 7/1998 | Nakatuka | ..................... 333/104 |
| 5,815,359 A | 9/1998 | Maytum et al. | |
| 5,844,761 A | 12/1998 | Place, IV | |
| 5,987,335 A | 11/1999 | Knoedl, Jr. et al. | |
| 6,681,100 B1 * | 1/2004 | Ge | ............................... 455/78 |

* cited by examiner

Primary Examiner—Vivian Chin
Assistant Examiner—Yuwen Pan
(74) Attorney, Agent, or Firm—Herman J. Hohauser

(57) ABSTRACT

A remotely mountable weatherproof bi-directional, half-duplex switching amplifier system is designed to provide maximum range for low power half-duplex radios such as Spread Spectrum radio transceivers. This invention automatically senses when to go into the transmitter amplification mode and puts all the transmit power right at the antenna. In the receive mode, it provides low noise pre amplification of received signals at the antenna thereby minimizing or even eliminating the effects of the coaxial transmission line from the radio transceiver to the remote location of the antenna. The invention is preferred to be in a waterproof enclosure adjacent to the antenna mounted to a pole and powered by a DC injector and excited by a transceiver, both pole and injector located remote from the mounting pole and also includes an improved electrostatic overvoltage protection device.

6 Claims, 9 Drawing Sheets

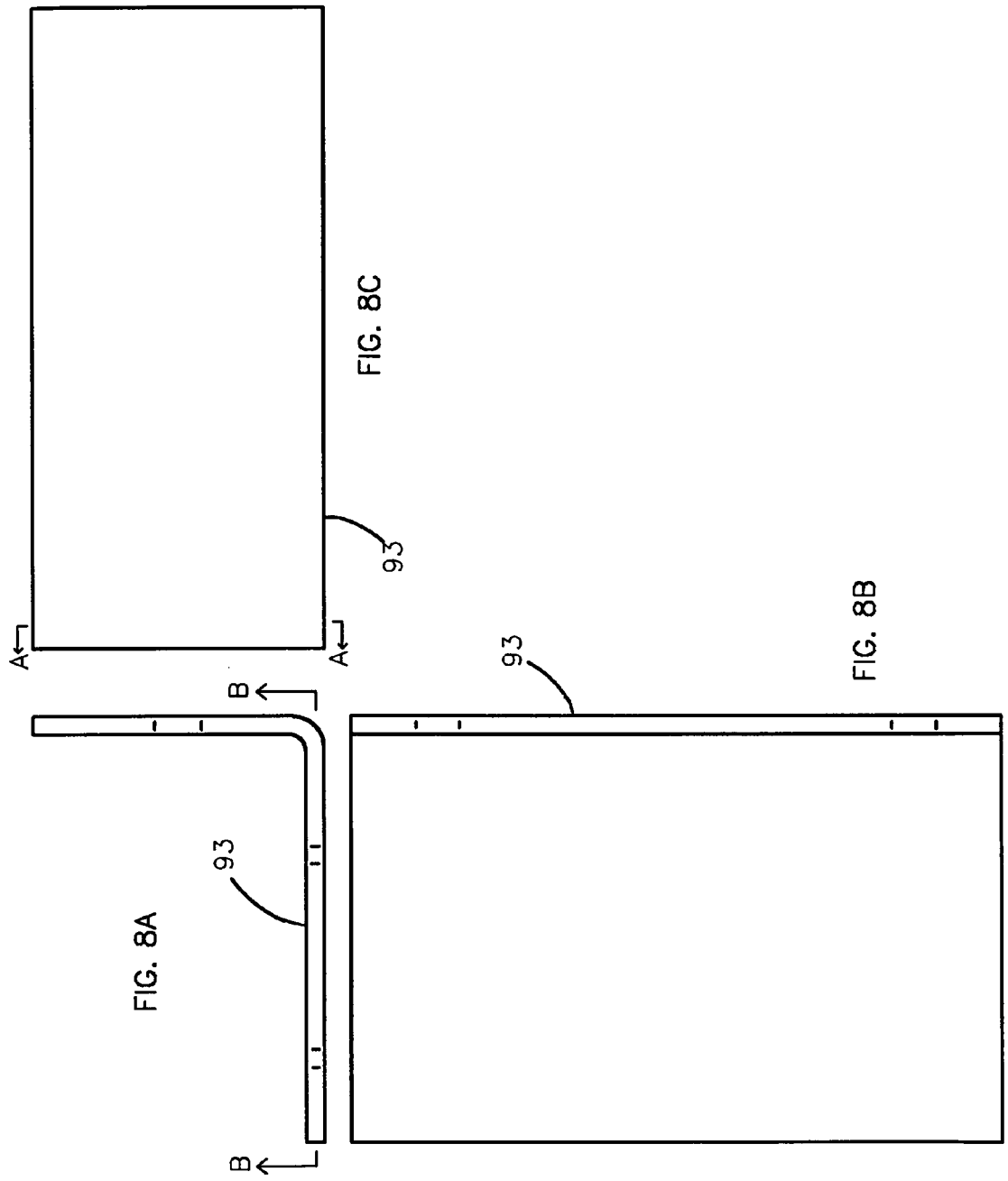

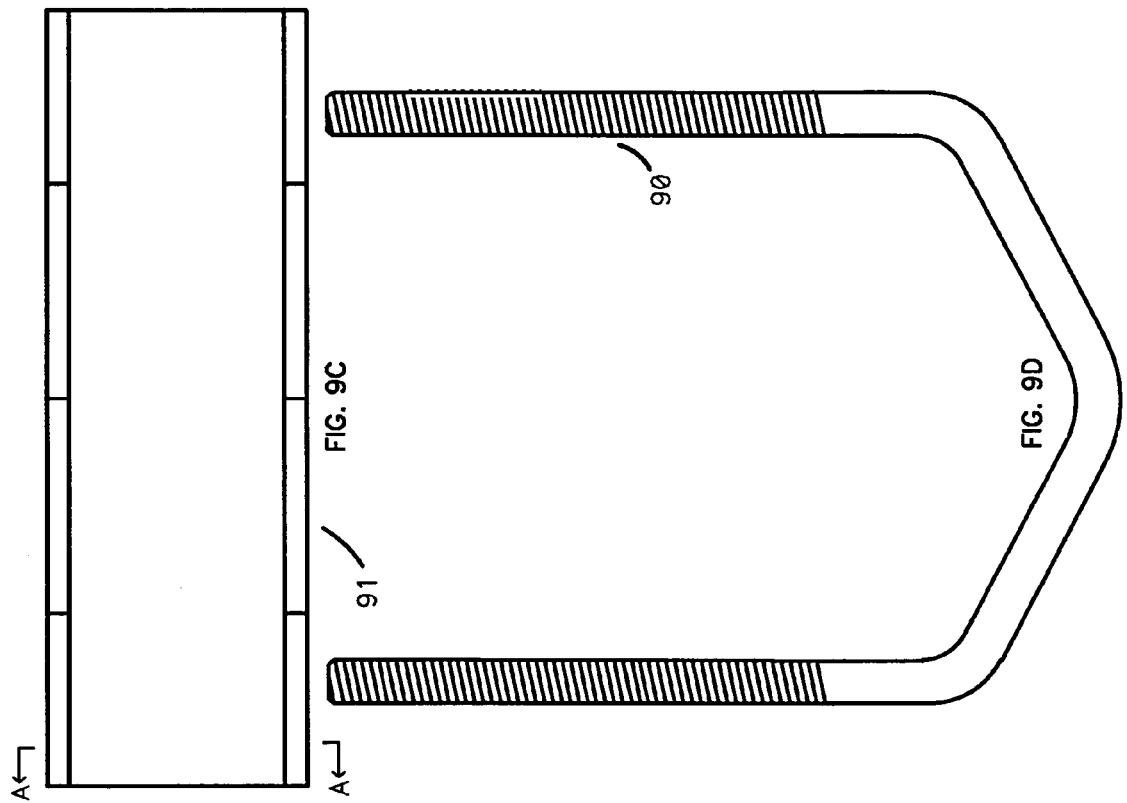
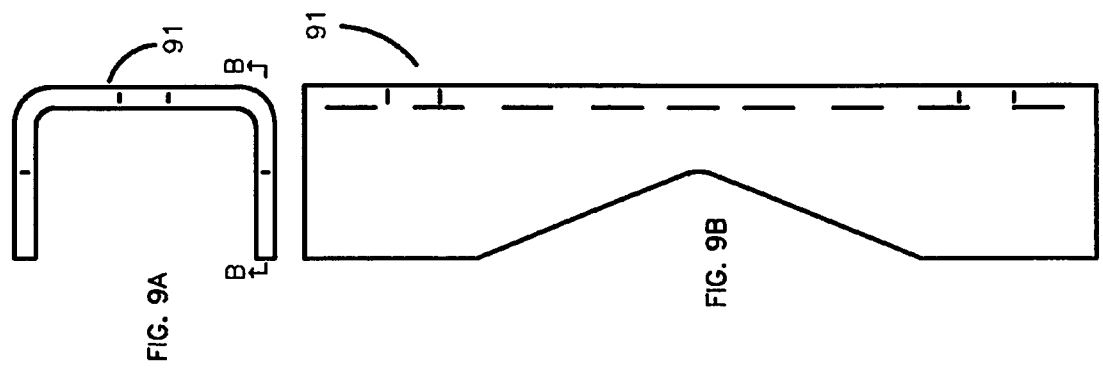

BI-DIRECTIONAL SWITCHED RF AMPLIFIER, WATERPROOF HOUSING, ELECTROSTATIC OVERVOLTAGE PROTECTION DEVICE, AND MOUNTING BRACKET THEREFOR

CROSS REFERENCE TO RELATED APPLICATIONS

This application is a Conversion of Provisional Application Ser. No. 60/120,639, filed Feb. 18, 1999.

BACKGROUND OF THE INVENTION

The present invention is a result of the proliferation of low power, Spread Spectrum radio modem devices in the 902-928 MHz, 2.4 GHz and 5.7 GHz bands. Popularity of these radio devices is largely due to FCC regulations that allow appropriately certified radio transceivers to be operated license free. This certification requirement restricts the transmitter output power in order to enable many users to share the band. Further, since the radios are Spread Spectrum devices, they can generally tolerate interference from other radios transmitting in the same geographical area.

Many of these prior art devices were designed and intended for short range operation (less than 1000 feet, for example, due to the low transmit power restrictions and the requirement of unobstructed line-of-site between antennas for maximum range). However, if external outdoor gain antennas are placed on tall buildings or radio towers, considerable line-of-site ranges (measured in miles) are possible. The problem here is that the losses in the typical, inexpensive coaxial transmission line between the radio and the antenna at these frequencies can be excessive unless prohibitively expensive cable is used. Putting an antenna on a tall radio tower or building would give clear line of sight to many locations, but this is largely defeated by the transmission cable loss.

In a typical RF bi-directional amplifier application, a duplex amplifier with heavy filtering, such as in U.S. Pat. No. 5,502,715 to Penny, is used. However, this is in general unsatisfactory due to the fact that not only are both transmit and receive amplifiers are on at all times, thus leading to wasteful power usage, but also heavy filtering is also necessary to keep the transmit and receive signals from interfering with each other, leading to further expense and power wastage. Still further, since each transmit and receive signal must be put to a separate frequency to avoid interference, this design is wasteful of spectrum bandwidth, a scarce commodity in many applications.

SUMMARY OF THE INVENTION

It is an object of the invention disclosed herein to overcome these problems and provide a telecommunications system for ranges up to 60 miles point-to-point while keeping the radiated power compliant with the certification regulations.

It is also an object of the invention to provide an improved arrangement for amplification of transmit and receive radio signals. More specifically, the invention discloses the means to locate a half- duplex, switching bi-directional amplifier close to the antenna.

It is also an object of the invention to provide such an RF amplifier with an improved waterproof housing enclosure for protection against water accumulation.

It is still further an object of the invention to provide a universal mounting V bolt mounting bracket for the waterproof housing enclosure.

It is still further an object of the invention to provide for an improved mounting arrangement for the internal printed circuit boards directly to the housing cover to provide for minimum VSWR from the coaxial connectors to the PC board strip line traces.

It is still further an object of the invention to provide temperature compensated RF level sensing circuitry to permit reliable operation over a very wide temperature range.

It is still further an object of the invention to provide LED indicators on the DC injector circuitry to show the operational status of the remote bi-directional switching amplifier by monitoring the current drawn by this remote bi-directional switching amplifier.

It is still a further object of the invention to provide a solid state switch for switching between the transmit (TX) and the receive (RX) modes of the remote bi-directional switching amplifier.

It is still a further object of the invention to provide for an electrostatic overvoltage discharge protection device, in one embodiment at the antenna port in the remote bi-directional switched amplifier circuit board, and in another embodiment as a separate component for generalized radio frequency use.

Additional objects, features, and advantages of the various aspects of the present invention will become apparent from the following description of the preferred embodiments, which description should be taken in conjunction with the accompanying drawings.

BRIEF DESCRIPTION OF THE DRAWINGS

FIGS. 8A, 8B, and 8C show various views of a preferred universal mounting L-member.

FIGS. 9A, 9B, and 9C show various views of a preferred implementation of the universal channel bracket to hold the L-bracket against the mounting mast.

FIG. 9D shows a preferred implementation of the V-bolt used with the universal channel bracket to hold the L-bracket against the mounting mast.

DETAILED DESCRIPTION OF THE PREFERRED EMBODIMENTS

Figure 1:
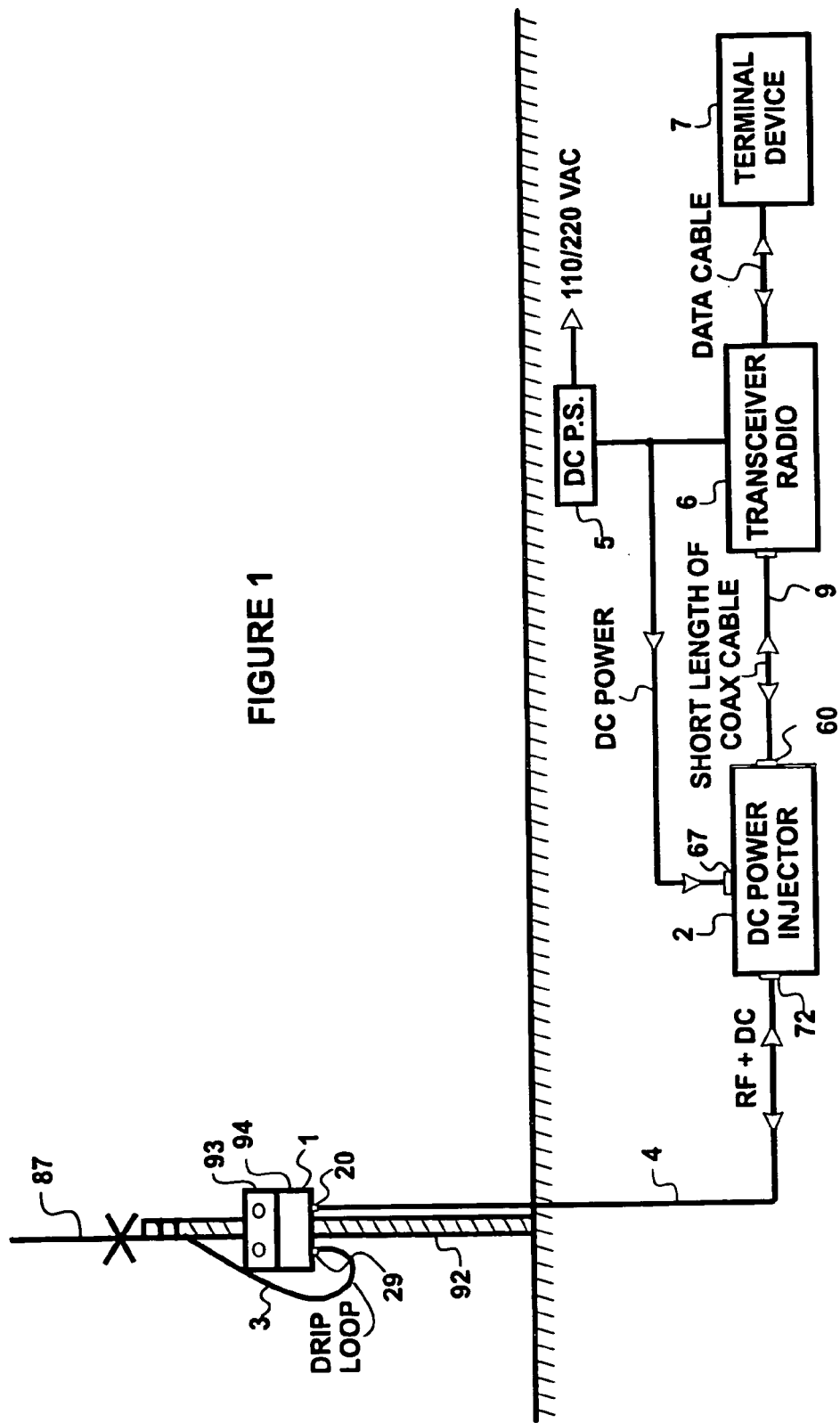
FIG. 1 shows a typical installation diagram with the bi-directional switching amplifier in conjunction with the related elements for a telecommunications system.

FIG. 1 show the remote bi-directional switching amplifier telecommunications system in a preferred typical installation. The bi-directional amplifier 1, inside the housing enclosure 94; the DC power input to the housing enclosure 94 from the DC power injector 2 supplied through connection 20, connection between the bi-directional switching amplifier 1 at 29 to the antenna 87 is made through a short length of inexpensive connecting cable 3 and the L-bracket 93 in conjunction with the mast 92 are the primary preferred components of the remote part of the system. The secondary components include a transmission line 4 connected to the housing enclosure 94 at 20, a DC Power Injector 2 preferably located remote from the bi-directional switching amplifier 1 housing 94, a DC Power Supply 5 which can be either DC or AC line operated, a radio transceiver 6, an appropriate computer, router or terminal device 7, and connecting cables between the various elements, such as 9 between the DC power injector and the radio transceiver. The connecting cables can be varied in type so long as they are compatible with the system. The object of the invention is to use inexpensive, easily available cables wherever possible.

Figure 3:
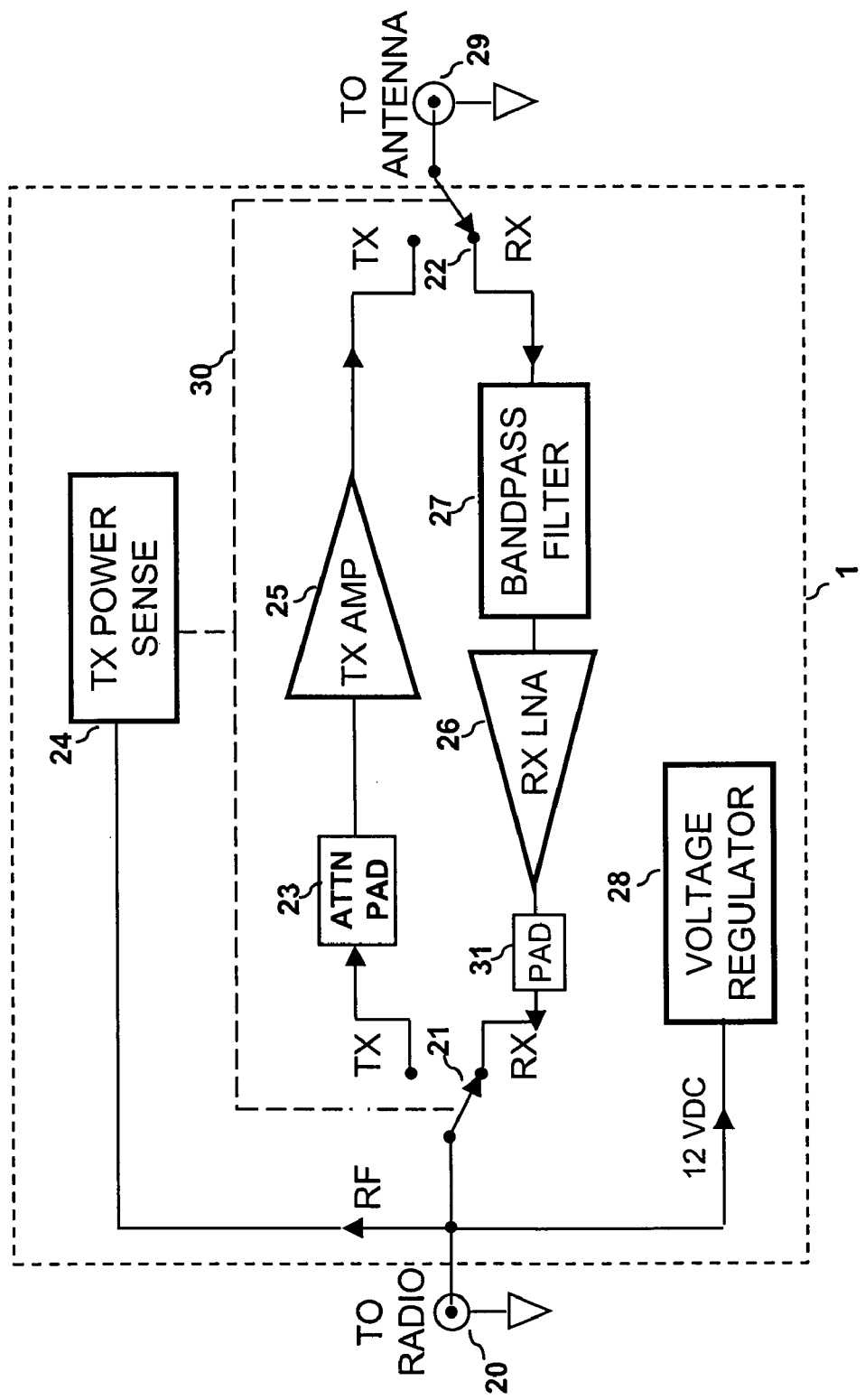
FIG. 3 shows the functional block diagram of the bi-directional switching amplifier module.

The bi-directional switching amplifier 1 is mounted physically close to the antenna and is preferably, but not necessarily, outdoors. It boosts the low power transmit, TX, signal from the radio transceiver 6 to provide the full transmit output power right at the antenna per se. It also contains a low noise amplifier (LNA) to pre-amplify the received signal when in receive mode, RX, which overcomes the loss in transmission line 4 to the radio transceiver 6. The bi-directional switching amplifier module 1 has an RF (radio frequency) sensing circuit to automatically switch from the receive RX mode to the transmit TX mode when the transceiver radio 6 goes into transmit, TX. The details of this bi-directional switching amplifier 1 are shown in FIG. 3 and described in detail below.

Figure 2:
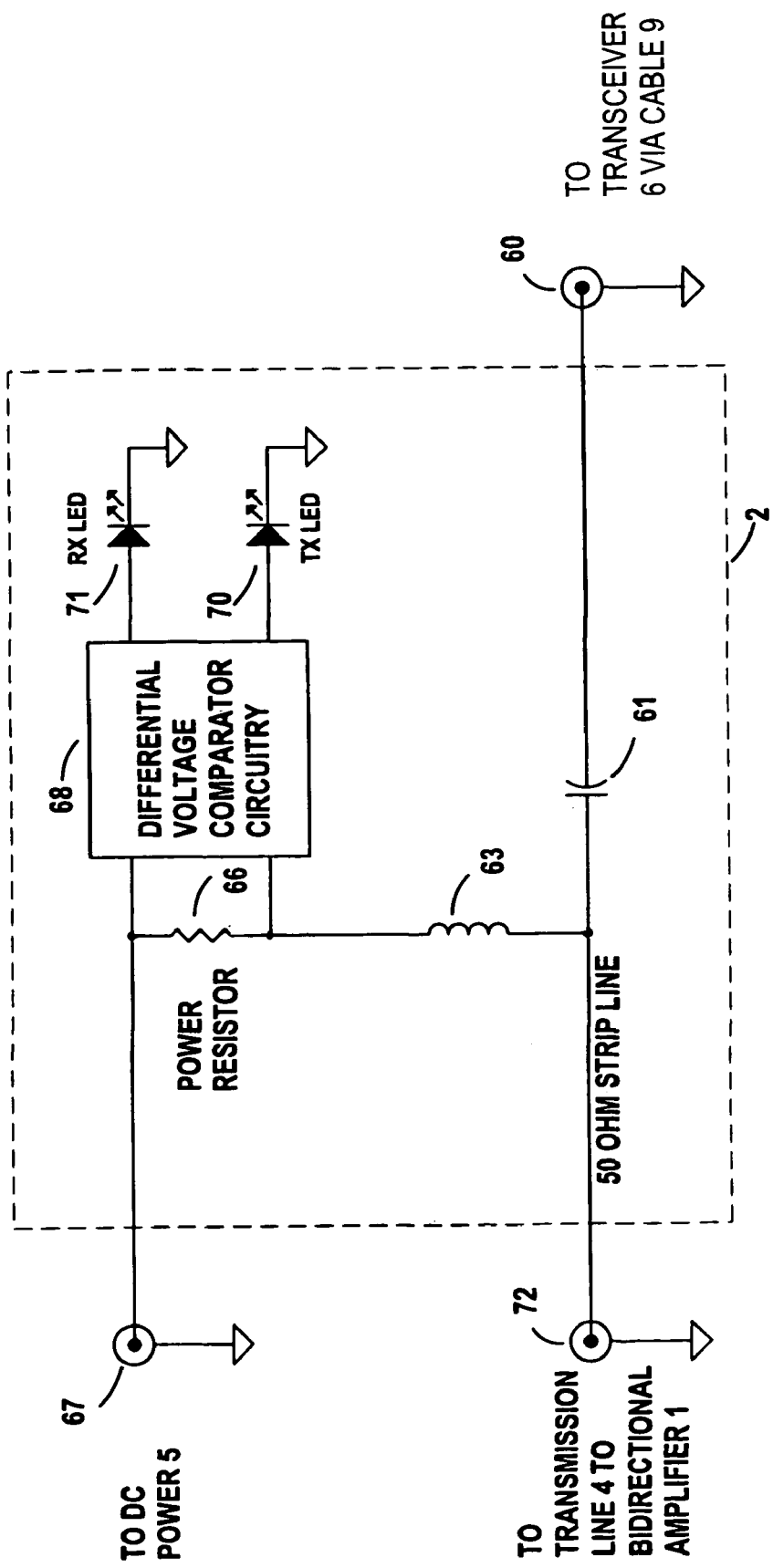
FIG. 2 shows how the DC power is inserted into the transmission line to the remote mounted amplifier module through the DC injector circuitry.

The DC power injector 2 passes the RF signal through it transparently, and injects a DC voltage onto the transmission line 4 to provide DC power to the remotely mounted bi-directional switching amplifier 1 in lousing 94. The DC power injector 2, as at FIG. 2, has LEDs to indicate when the externally mounted remote bi-directional switching amplifier is in receive, RX, or transmit, TX, modes for operator monitoring.

Figure 7:
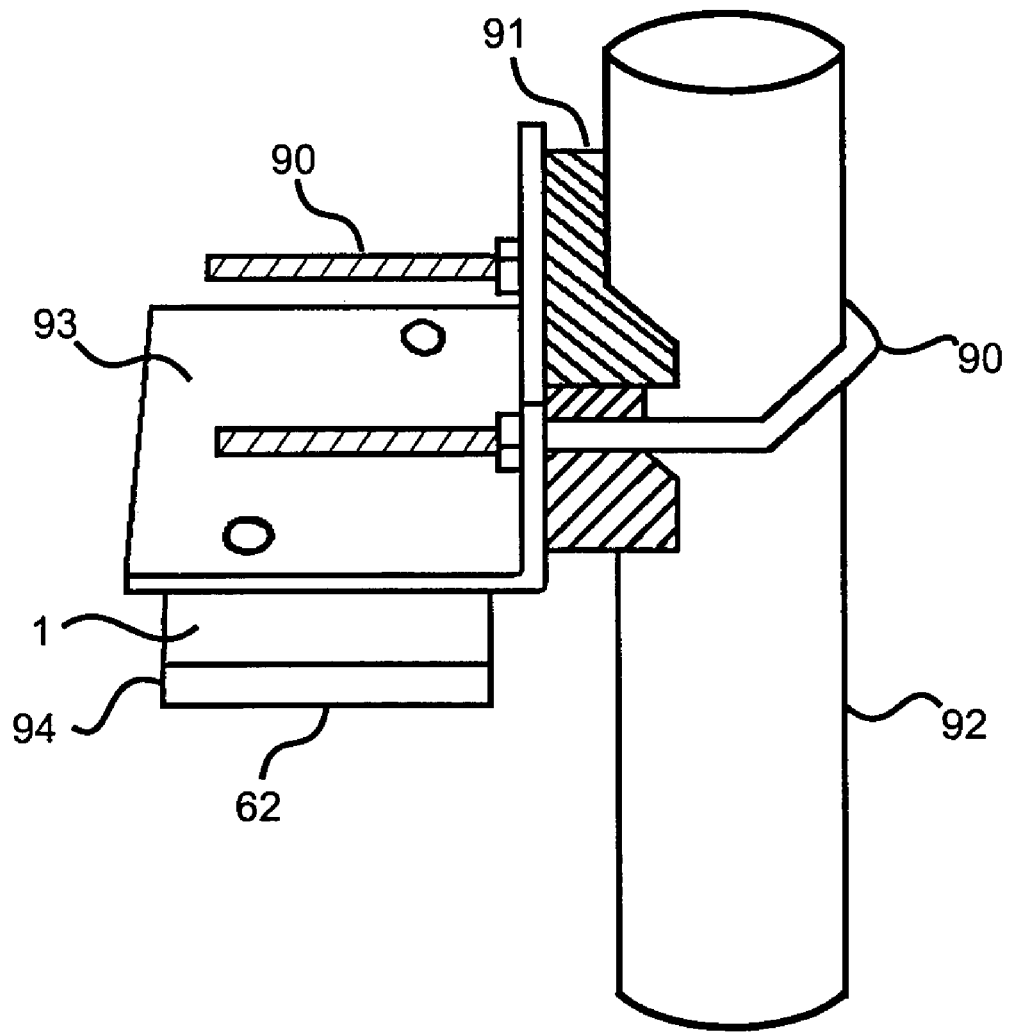
FIG. 7 show an isometric view of a preferred bi-directional switching amplifier housing mounting arrangement.

One of the preferred features of the invention is the bi-directional switching amplifier module 1 in housing 94 mounting arrangement and hardware associated with it. This mounting arrangement ensures that the bi-directional switching amplifier housing enclosure 94 is installed with the coax connectors 64 mounted to the cover 62 are facing in a downward direction. This mounting arrangement prevents water accumulation and migration into the housing enclosure 94. This mounting arrangement, in one embodiment, preferably also features a special design "V" bolt 90 that enables the preferred L-bracket 93 in conjunction with the preferred universal channel bracket 91 to be mounted on pole or mast 92 with diameters from ½" to over 3", thus providing for a universal mounting. This completed preferred mounting arrangement is shown at FIG. 7. A specific drawing for each piece is shown at FIGS. 8A to 9D.

The DC Power Injector

Referring again to FIG. 2, the DC power injector 2 gets DC power from the DC power source 5 through connector 67 and inserts the DC current to the hot lead 72 of the coax connector that connects to the transmission cable through power resistor 66 and choke 63 in order to power the bi-directional switching amplifier electronics. LED indicators 70, 71 are provided to show to the operator that DC power is applied and when the bi-directional switching amplifier module 1 switches into the transmit mode, TX. The DC power injector 2 also provides the necessary DC blocking to radio transceiver 6 through connector 60 with capacitor 61.

As seen by refering to the figures, the radio transceiver 6 is connected to the DC power injector 2 via a coax cable 9 at the input connector 60, 64 preferably to a 50-ohm stripline 63 on the PC board 61. The RF signal to and from the radio transceiver 6 is coupled to the output connector 72 via a blocking capacitor 61 which keeps the DC voltage from going into the radio transceiver 6. DC voltage is injected onto the bi-directional switching amplifier side of this coupling capacitor 61 from a jack or plug 67 through an RF choke 63 and a power resistor 66.

The DC voltage drop across the power resistor 66 is a measure of the current drawn by bi-directional switching amplifier 1 module. Differential voltage comparator circuitry 68 compares this voltage drop to a predetermined level. If the current is less then this predetermined level, the comparator circuitry 68 illuminates the green Receive (RX) LED 71. If the current is greater then this predetermined level, the comparator circuitry 68 illuminates the red Transmit (TX) LED 70.

The Bi-Directional Switched Amplifier Module

The bi-directional switched amplifier module 1 circuitry is housed in a watertight enclosure housing 94 physically mounted adjacent to the antenna 87. Hereinafter, the terms "enclosure" and "housing" will be used interchangeably. As shown in FIG. 3, the bi-directional switched amplifier 1 gets its DC power from the coax transmission line 4 connected to it at the input coax connector 20. The DC power is siphoned off and the RF signal is capacitively coupled to the RF radio transceiver switch 21. Normally the bi-directional switching amplifier 1 is in the Receive (RX) mode as FIG. 3 illustrates. In this mode, RF signals from the antenna port connection 29 are passed through the RF antenna switch 22, through the optional bandpass filter 27 and amplified by the RX LNA 26. To reduce the signal and noise coming out of the amplifier, an optional attenuator pad 31 can be installed.

When the radio transceiver 6 connected to the DC injector 2 goes into the transmit mode, the TX power is detected by the sense circuitry 24 and switches both the switch 21 from the radio transceiver and the switch 22 to the antenna to the TX position. The power sense circuitry 24 also applies DC power to the transmitter power amplifier 25 and removes power from the RX LNA 26. In this mode, the RF signal from the radio transceiver 6 can be passed through the optional RF attenuator pad 23, into the transmitter TX power amplifier 25 and to the antenna port 29 via the antenna RF antenna switch 22. When the radio drops out of transmit, the TX power sense circuitry switches the RF switches 21, 22 back to the receive RX mode, removes power from the transmitter power amplifier 25 and turns the receive RX LNA 26 back on.

Electrostatic Overvoltage Protection Device

Another aspect of the invention is an improved electrostatic overvoltage protection device, or "lightning arrester."

Here it has been discovered that a conductor of one-quarter the desired wavelength of a predetermined frequency band connected between a source of signal and a reference potential, such as ground, will have almost no effect on the desired signal band and signal transmission but will shunt virtually all frequencies outside this predetermined frequency band to a reference potential such as ground, thus protecting the integrity of any electronic component connected to the signal input.

Figure 4A:
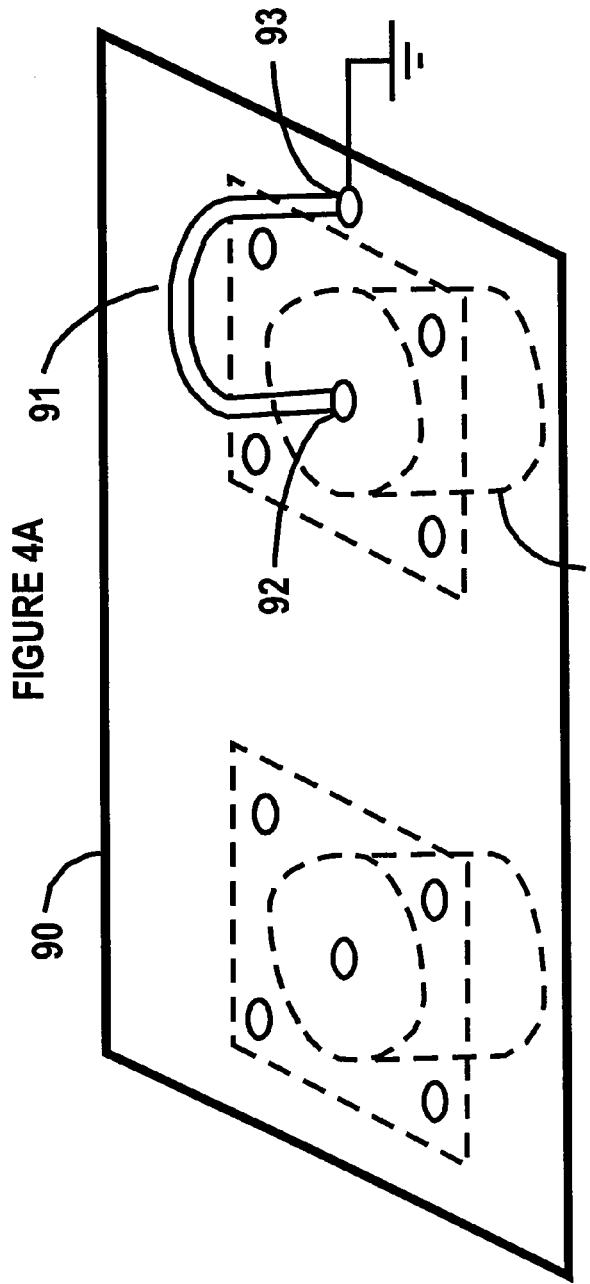
FIG. 4A shows the details of the preferred electrostatic overvoltage discharge protection device used in a circuit board environment such as at the antenna connector on the bi-directional switching amplifier module.

In a first preferred embodiment, the electrostatic overvoltage protection for an electronic circuit in a circuit board environment, such as the bi-directional switching amplifier, is shown in FIG. 4A. This protector can protect against lightning, electrostatic charge from the environment, an Electro Magnetic Pulse ("EMP"), and any other source of static or transient overvoltage. The coax connector 29 that connects to the antenna in a preferred embodiment has a loop of heavy gauge conductor 91 of a length equal to one-quarter of the wavelength of the desired RF operational band connected from the signal input 92 of connector 29 to a source of reference potential, such as ground 93 on the PC board, thus forming an RF choke to that desired frequency band at the input and a direct ground to all other frequencies. This conductor 91 may also be a trace on the PC board or any other convenient means of forming an equivalent one-quarter wavelength conductor such that it shorts the center pin 92 directly to a reference potential such as ground 93 on the PC board for all frequencies outside the desired frequency band. This RF shunt choke is has a negligible effect on the desired RF band signal passing through the amplifier. However, any stray DC, lightning, or other electrostatic overvoltage fault at the input pin 92 of the antenna connector 29 finds this loop a very low impedance to ground (provided that the mast or pole is properly grounded) and shunts the current through it to this ground, thereby protecting the electronic circuit board, such as the bi-directional switching amplifier 1.

Figure 4B:
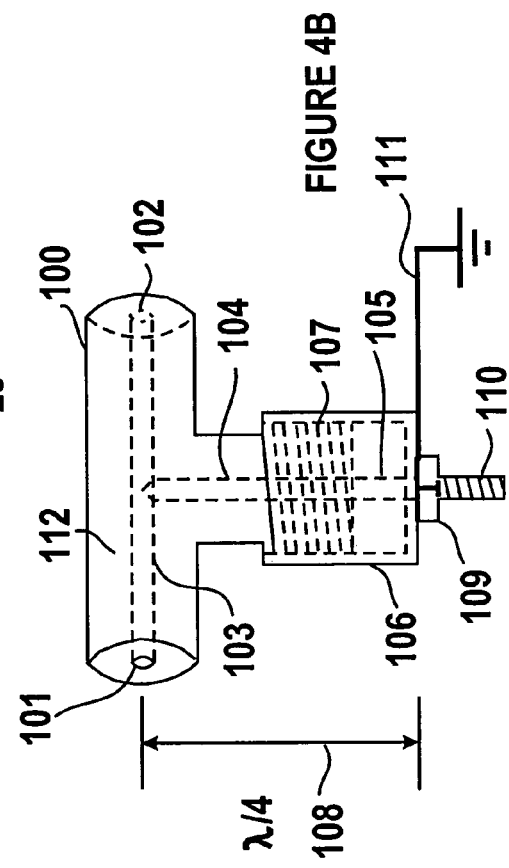
FIG. 4B shows the details of the preferred electrostatic overvoltage discharge protection device in a separate component form.

A second embodiment of the electrostatic overvoltage protection device is in a separate component form with both the internal and external details are shown at FIG. 4B. The protection device, or arrester, is constructed of a T-connector housing 100 with input connection 101 and output connection 102. The input 101 and output 102 are bi-directional and may be interchanged. A pass-through conductor 103 connects the input 101 and output 102, and conductor 103 is surrounded by a suitable dielectric material 112 which is inside of the body housing 100. The dielectric material 112 may also be air or a material such as rexolite, delrin, teflon or other non-conductor suitable for the radio frequency band intended. The dielectric material 112 may be a combination of air and other non-conducting materials.

Here the one-quarter wavelength protector of the desired frequency band, taking into account the dielectric constant of the dielectric material 112, is conductor 104 which connects to the through conductor 103 at one end, and to a grounding or shorting member to the outside housing at the other end. One manner of achieving this shorting to the outside T- connector housing 100 is shown here through a ground pin such as 105 on the ground end. Here the ground pin 105 extends through an end cap 106 and thus forms an effective short to the external protector housing 100 for the conductor 104. The connector-protection device 100 can then be put to a source of reference potential such as ground by any convenient manner. In one preferred embodiment, the ground pin 105 extends beyond the housing 100 to form a suitable ground screw 110. As above, the total length of the conductor 104 and ground pin 105 is one quarter wavelength, $\lambda/4$, length 108 (or any odd multiple of one quarter wavelength) of the desired operating frequency as measured from the pass-through conductor 103 to the end cap assembly 106. As above, this presents a short circuit to direct currents (DC) and any non-desired frequency and a high impedance only to the desired operating frequency band. The assembly of conductor 104, ground pin 105, end cap 106, and ground screw 110 may be constructed as one continuous piece, if desired.

The end cap 106 can attach to the main body of the arrester 100 by either an internal or external thread 107 (male or female connection) or any other suitable means of connection. In one simple preferred embodiment the ground screw 110 which passes through the end cap 106 is used for the attachment of a grounding conductor 111, which can be a combination lug and/or braid, and held in place by nut 109. The ground screw 110 may be of any length and is preferably highly conductive. Washers or other appropriate mounting hardware may be used between conductor 111, end cap 106 and nut 109. Ground conductor 111 may also be attached to end cap 106 by soldering, riveting, welding or any other method.

Still further, the shorting of conductor 104 to the housing 100 at the ground end can be done by any other convenient means such as a copper foil, a highly conductive plate soldered, brazed, or welded in place, or any other conductor connection between the distal end of conductor 104 and the housing 100 in place of this end cap 106, which is only one convenient manner of providing this connection, and a threaded member is not necessary, but useful in some situations to tune the desired band.

This separate component protection device of FIG. 4B can have an entire range of other uses other than as an antenna protector, for instance such as protecting signals between computers or other communications devices, protection of control signals to power equipment, or any kind of networking where there may be some kind of electrostatic or transient overvoltage fault condition in a radio frequency path of a particular predetermined frequency band connection.

The RF Power Sense Circuitry

Figure 5:
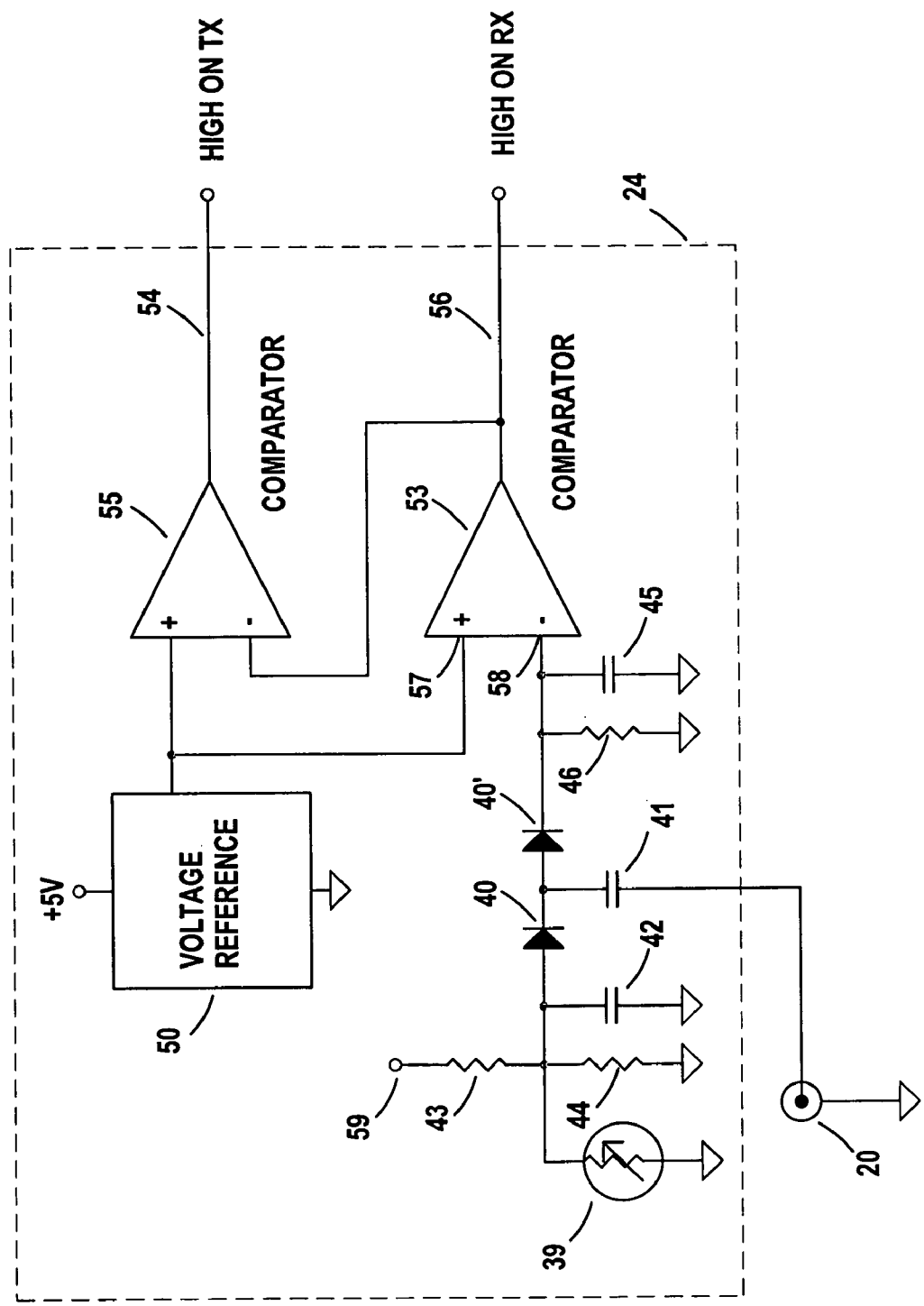
FIG. 5 shows the details of a preferred RF sensing circuit used in the remote bi-directional switching amplifier to enable it to switch from the receive to the transmit mode of operation.

The RF Power Sense Circuitry 24 best seen in FIG. 5, needs to detect low level RF signals and work in hostile outdoor environments. It is vital that the bi-directional switching amplifier module 1 quickly and reliably detect the presence of a transmitted signal from the radio transceiver 6 under all temperature ranges in order to switch from the Receive RX to the Transmit TX mode. The present invention utilizes a solid state circuit that senses and detects the presence of radio frequency energy (RF) and provides a digital output signal when said Transmit TX RF signal is present. The sensing circuitry 24 utilizes detection diodes 40, 40' that are forward biased to almost the point of conduction to provide for maximum sensitivity and reliable detection for signal levels as low as 1 milliwatt. The biasing circuitry for these diodes are temperature compensated with a temperature-controlled resistor (thermistor) 39 to ensure consistent performance over a wide temperature range.

Referring to FIG. 5, RF energy from the bi-directional switching amplifier 1 input connector 20 is coupled via a capacitor 41 to the junction of the preferred low capacitance Schottky dual diodes 40, 40' in series. While any suitable diodes can be used, these have been found to be cost effective, reliable components well suited for this application. These diodes 40, 40' combined with capacitors 42, 45 form a voltage doubling circuit to rectify and detect an RF signal on the input connector 20. The resulting rectified signal is applied to an input 58 of a comparator 53.

To provide for maximum sensitivity, diodes 40, 40' are forward biased to just below the conduction point via a 5 volt regulated source 59 through the biasing resistors 43, 44, and 46. However, since the transconductance of the diodes 40, 40' change greatly with temperature, a thermistor 39 is added to the circuit. This thermistor 39 adjusts the current flow through the diodes 40, 40' to provide a relatively uniform RF signal level detection point over a very wide temperature range.

The trip point for the circuitry is set by the voltage reference source 50. When the DC voltage present on input 58 exceeds the pre-set DC level on input 57, the comparator 53 changes state indicating that an RF signal is present at the input connector 20. The output 56 of this comparator 53 goes low. A second comparator 55 inverts this signal and provides a complementary logical high output at 54 for use by the RF switching and other circuitry in the bi-directional switching amplifier module.

The Preferred Mounting Arrangement for the Bi-Directional Amplifier Module

Waterproof enclosures, even if mounted properly, can ultimately have a water leak when mounted outdoors through the coaxial connectors that penetrate its surface. The present invention discloses a preferred arrangement to mount such a waterproof enclosure or housing 94 containing the bi-directional switching amplifier module 1 outdoors especially to a pole or mast 92 mounted physically close to the radio antenna 87. The antenna 87 can be at any adjacent position to the enclosure housing 94, i.e. above the enclosure, at the same height, or below the enclosure. In the preferred embodiment, the mounting of the enclosure 94 for the bi-directional switching amplifier 1 has the connectors facing in a downward direction. Especially when used with drip loops, this mounting arrangement results in water being drawn away by gravity from the waterproof enclosure 94 and the external connections rather then giving it a direct path to enter such as would be the case if the connectors 20, 29 were installed on any other face of the enclosure 94. The connection to the antenna 87 is also preferred to be in a downward position to minimize water migration into the connecting cable 3.

Further, conventional U-bolts mounting means or any other conventional structure for adjustably mounting the antenna 87 and housing 94 can be used with the invention. Conventional U-bolts and round masts 92 would be particularly useful in a new installation of many units where all the mounting means would be the same. However, in retrofit installations U-bolts only lend themselves to mountings on a very limited range of pole or mast diameters. Thus while U-bolts can be used with the invention, a preferred new and improved universal mounting means overcomes problems associated with these limitations by enabling installers to use a wide range of masts or poles 92 to mount the waterproof enclosure 94 and antenna 87. A new mounting bracket 93 and V-bolt design 90 such as described herein enables the amplifier enclosure 94 to be mounted on any diameter mast or pole 92 from 12" to over 3" diameter. Thus during field installations, and especially retro-fit installations, an installer would not have to locate a mast or pole of particular diameter to accommodate the limited range the diameter of standard U-bolts mounting arrangements, but could bolt the mounting hardware to just about anything in this universal arrangement.

This preferred universal mounting arrangement is shown in FIGS. 7, 8A–8C, and 9A–9D. It comprises the V-bolt 90, a stepped channel piece 91 for the V-bolt and pole 92 to work against, L-bracket 93 to secure the channel piece 91 to the bi-directional switching amplifier module housing 94 and the nuts and washers 95 needed to hold the V- bolt 90 against the back of the L-bracket 93. Thus the bi-directional switching amplifier module housing 94 is secured as designed with the connectors 20, 29 facing downward. As seen in FIG. 7, the L-bracket 93 provides convenient mounting for the amplifier housing 94 to the V- bolt 90 as well as providing additional weather protection as a roof- covering.

Description of Preferred the PC Board Mounting Arrangement

The Printed Circuit (PC) boards 61 containing the electronic circuitry for the bi-directional switching amplifier module 1 and DC power injector 2 are preferably mounted to the top cover or lid 62 of their respective enclosures. This permits the coax connectors 64 to be mounted directly to the PC board 61, which provides for the best impedance match from these connectors to the PC board 61, with the PC board 61 traces 63 acting as strip lines to the circuitry on the board.

Figure 6A:
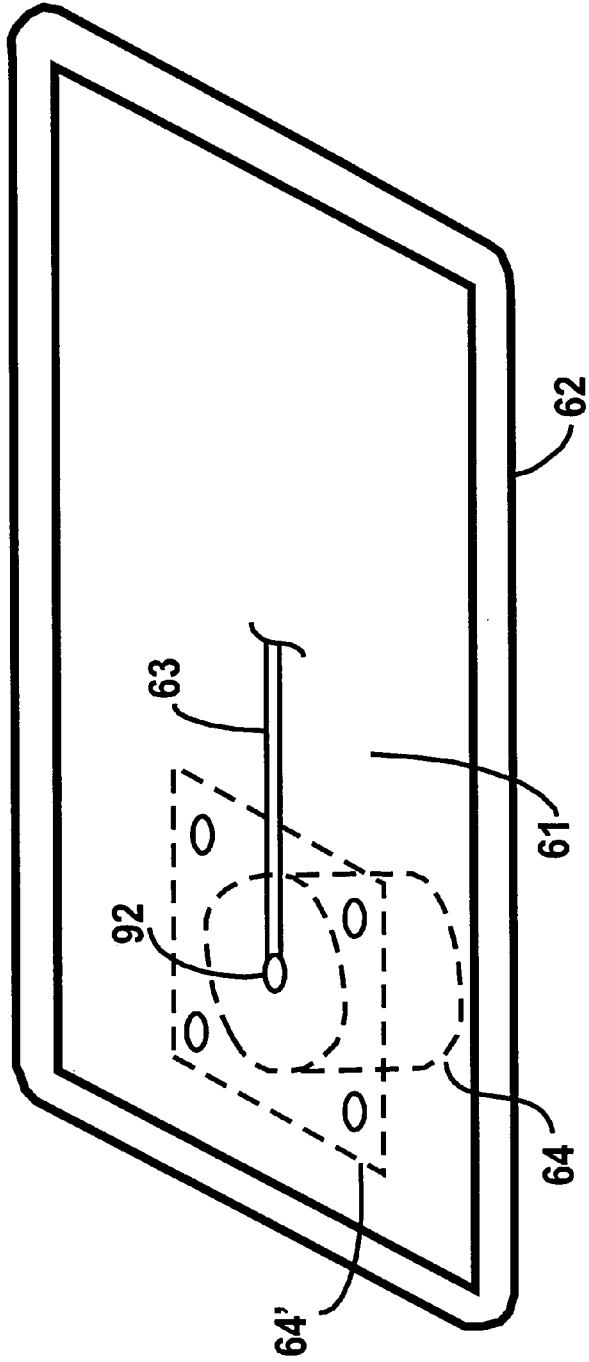
FIGS. 6A and 6B show the PC board mounted on the housing cover of the bi-directional switching amplifier module or of the DC injector in isometric and side view, respectively.
Figure 6B:
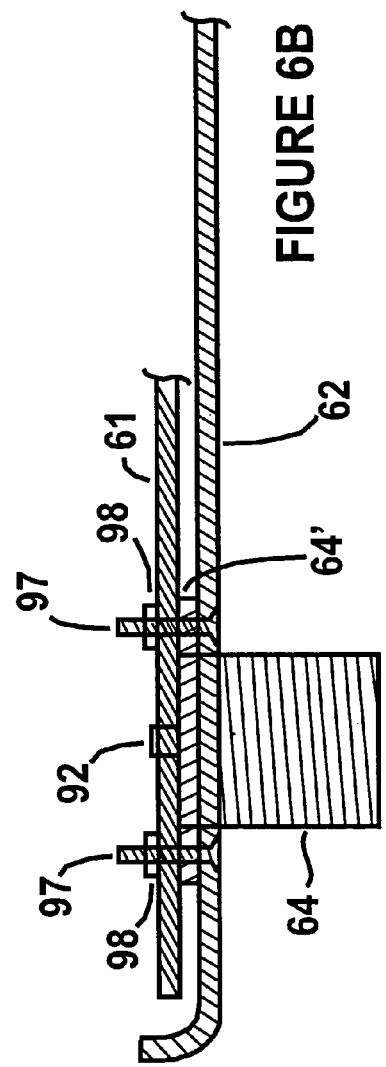

FIGS. 6A and 6B show how the PC board 61 is preferably typically mounted to the top cover or lid 62 of the enclosure. The coax connectors 64, for example N-female type, protrude through holes on the top of the cover 62. The flange 64' of connector 64 is sandwiched between the inside of the top cover 62 and the ground plane bottom of the PC board 61. The flange 64' of the connector 64 is fastened between the top of the cover 62 and the bottom PC board 61 using appropriate machine screws 97 and nuts 98 or any other fastening scheme intended by the manufacturer of the connector 64. The center pin 92 of the connector is soldered or otherwise electrically connected directly through to the PC board 61 to trace 63, which forms a preferably 50-ohm stripline to the rest of the RF circuitry. The ground connection to the PC board is secured through four mounting screws 97 or other equivalent fastening means. This presents the lowest VSWR to the transmission line connected to the device on 61 through the connector 64 and provides for the least possible loss.

A highly efficient RF bi-directional switching amplifier, housing, universal mounting and electrostatic overvoltage protection means are disclosed for a modern telecommunications system. Thus by using the disclosure and teachings of the invention, any practitioner in the art is enabled to make and use the invention.

What we claim is:

1. A bi-directional switched RF amplifier, comprising:
   an external connection to an antenna,
   an external connection to a transceiver radio,
   a transmitting (TX) amplifier,
   a receiving (RX) amplifier,
   said transmitting and said receiving amplifiers being arranged between said radio and antenna external connections,
   a double pole, double throw switch, one switch pole connected to said radio external connection and the other switch pole being connected to said antenna external connection,
   such that when said double pole, double throw switch is in one position the transmitting amplifier is disconnected from said external connections, and the input of said receiving amplifier is connected to said antenna external connection and the output of said receiving amplifier is connected to said radio external connection, such that when said double pole, double throw switch is in the other position the receiving amplifier is disconnected from said external connections, and the input of said transmitting amplifier is connected to said radio external connection and the output of said transmitting amplifier is connected at said antenna external connection, and said position of said double pole, double throw switch being controlled by a transmit power sense circuit.

2. A bi-directional switched RF amplifier as in claim 1, wherein:

said receiving amplifier is a low noise amplifier.

3. A bi-directional switched RF amplifier as in claim 2, additionally comprising:

a bandpass filter connected between said antenna external connection and said receiving amplifier input, and pads, including attenuation pads, connected to at least one of said receiving amplifier output and said transmitting amplifier input.

4. A bi-directional switched RF amplifier as in claim 1, wherein:

the powering for both said receiving amplifier and said transmitting amplifier is a source of DC potential applied through said external connection to a radio transceiver through a DC power injector.

5. A direct current (DC) power injector circuit for a remote bi-directional switched RF amplifier, comprising:

a source of direct current connected to said remote bi-directional switched RF amplifier through a current sensor, a connection from said current sensor through a capacitor to a radio transceiver, said current sensor comprises a power resistor with two terminals in series between said source of direct current and said remote bi-directional switched RF amplifier, and, a differential voltage comparator is connected across said power resistor terminals to determine the operational mode of said remote bi-directional switched RF amplifier.

6. A direct current (DC) power injector circuit for a remote bi-directional switched RF amplifier as in claim 5, further comprising:

a pair of indicator lights, only one of which will be on at any time, to thus indicate said operational mode, either receive RX or transmit TX, of said remote bi- directional switched RF amplifier.

* * * * *